3,756,995
VANADIUM COMPOUND TRIALKYL ALUMINUM-HALOORGANIC ACID CATALYTIC PROCESS
Mitsuo Ichikawa, Tokyo, Yasumasa Takeuchi, Yokohama, Kenya Makino, Kawasaki, and Masayuki Endo, Yokohama, Japan, assignors to Japan Synthetic Rubber Company Limited, Tokyo, Japan
No Drawing. Filed Mar. 30, 1971, Ser. No. 129,570
Claims priority, application Japan, Apr. 10, 1970, 45/30,596, 45/30,597
Int. Cl. C08f 1/56
U.S. Cl. 260—85.3 R  2 Claims

ABSTRACT OF THE DISCLOSURE

A process for preparing conjugated diene-olefin copolymers which comprises bringing a conjugated diene and an olefin into contact with a catalyst formed of components selected, at least one each, from the groups (A), (B) and (C) consisting, respectively, of trialkyl aluminums, vanadium compounds, and halogenated organic acids.

---

This invention relates to a process for preparing copolymers of conjugated dienes and olefins. More particularly, the invention relates to a process for preparing high-molecular weight rubber-like copolymers of a conjugated diene and ethylene or α-olefin, and also conjugated diene-ethylene-α-olefin terpolymers, using a catalyst which consists of an organoaluminum compound, a transition metal compound, and a halogenated organic acid.

Of the numerous conjugated diolefin-olefin copolymers so far reported to have been synthesized on a laboratory scale, those which have been commercially produced are few. Butyl rubber, which is practically the only example of such copolymer in commercial production, is a copolymer of isobutylene and isoprene obtained by cationic polymerization. Nevertheless, it may well be said that butyl rubber is actually a homopolymer of isobutylene because isoprene accounts for merely less than two percent of the product.

Copolymerization of a conjugated diene and ethylene or α-olefin is accomplished in a number of ways using a composite catalyst of the Ziegler type. Known processes include the copolymerization of isoprene and propylene in the presence of trihexyl aluminum-vanadyl trichloride catalyst (Italian Pat. 566,913 to Societa General Montecatini (1957)), and the butadiene-propylene and isoprene-propylene copolymerization with triethyl aluminum-titanium tetrachloride catalyst (Suminoe et al., Kobunshi Kagaku (High Polymer Chemistry), 20, 262 (1963); ibid., 461). In any case, great difficulty is involved in obtaining a high-molecular weight copolymer in a high yield. Recently an alternative copolymer of propylene and butadiene was synthesized with the use of triethyl aluminum-vanadyl trichloride or vanadium tetrachloride (Furukawa et al., Polymer Letters, 7, 671 (1969)). However, the product does not appear to have a sufficiently high molecular weight for use as a rubber. In this case, it is reported that, in order to obtain the alternative copolymer, the catalyst must be prepared at a temperature below room temperature, because at upwards of room temperature the catalyst will become a Ziegler type (Kagaku (Chemistry), 25, 41 (1970)).

Previously we found out a novel process for preparing copolymers of conjugated dienes and conjugated vinyl compounds, for which a patent application is pending in U.S.A. (patent application No. 18,722), and have now arrived at the present invention after studying the possibility of applying the process to the copolymerization of conjugated dienes and olefins.

Thus, it is a primary object of the present invention to provide a process for preparing conjugated diene-olefin copolymers which comprises bringing a conjugated diene and olefin into contact with a catalyst composed of at least one compound each selected from the groups (a), (b) and (c) consisting, respectively, of trialkyl aluminums, vanadium compounds, and halogenated organic acids, in a hydrocarbon solvent.

According to the present invention, the composition of a conjugated diene-olefin copolymer can be adjusted as desired, and the copolymer is of random type—not of block type as is usually the case with a Ziegler type catalyst. Under chosen conditions, even an alternative copolymer can be made. For example, with the combination of butadiene and propylene, a high-molecular weight alternative copolymer which is rubber-like (at upwards of 30° C.) is produced under high catalyst activity. In this case the product is advantageously free from any copolymer of low molecular weight. Moreover, the catalyst according to this invention can be prepared over an extensive temperature range from a low temperature to a point above room temperature. This is one of the advantageous features of the invention.

The copolymers which are obtained in accordance with the present invention are quite new copolymers having important industrial possibilities as rubber or plastics.

The terpolymers of ethylene, α-olefin and conjugated diene are believed to serve as useful new industrial materials and also as new EPDM's. However, it is highly difficult to obtain an ethylene-propylene-conjugated diene terpolymer by any known process (I. E. C. Prod. Res. & Develop., 1, 65 (1962)). The EPDM's commercially available today, which are unable to incorporate conjugated dienes, use more expensive non-conjugated dienes, such as 1,4-hexadiene, methylene norbornene, ethylidene norbornene, dicyclopentadiene, etc.

Another object of the invention is to provide a process for preparing ethylene-propylene-conjugated diene terpolymers with good efficiency which has heretofore been considered difficult, that is to say, a process for preparing ethylene-α-olefin-conjugated diene multiple component copolymers which comprises bringing an ethylene, α-olefin and conjugated diene into contact with a catalyst composed of at least one compound each selected from the groups (a), (b) and (c) consisting, respectively, of trialkyl aluminum, vanadium compounds, and halogenated organic acids, in a hydrocarbon solvent.

The present invention makes it possible to manufacture useful synthetic rubber EPDM using an inexpensive conjugated diene (e.g., butadiene) in place of an expensive non-conjugated diene. Further, by the process of the present invention, a conjugated diene is copolymerized relatively at random. The properties obtained upon vulcanization of the ethylene-propylene-conjugated diene rubber are highly favorable, unlike those exhibited by the product produced in the copolymerization of an ordinary ethylene-propylene-non-conjugated diene system. The conjugated diene content can be freely adjusted and, if desired, the product may contain a large proportion of diene units.

The catalyst of the invention is composed of compounds each selected from the three groups (A), (B) and (C) consisting, respectively, of trialkyl aluminums, vanadium compounds, and halogenated organic acids. Typical of the trialkyl aluminums in the group (A) are trimethyl aluminum, triethyl aluminum, triisobutyl aluminum, and trihexyl aluminum, to cite a few. Examples of the vanadium compounds in the group (B) include vanadium tetrachloride, vanadium trichloride, vanadyl trichloride, vanadium acetyl acetonate, vanadyl trisacetyl acetonate, vanadyl naphthenate, vanadyl triethoxide, vanadyl tributoxide, vanadyl dichloromonoethoxide, vanadyl chlorodiethoxide, and vanadyl dichloromonobutoxide. Examples of the compounds in group (C) include trichloroacetic acid, tribromoacetic acid, trifluoroacetic acid, dichloroacetic acid, monochloroacetic acid, and $\alpha$-chloropropionic acid.

The component (B) is used in an amount ranging from 0.01 to 10 moles, preferably from 0.05 to 2 moles, per mol of the component (A). The component (C) ranges in amount from 0.01 to 10 moles, preferably from 0.1 to 5 moles, per mol of the component (A).

The catalyst components are each diluted with a diluent before use, but there are no particular limitations to the order of and temperature for mixing the three components. They have only to be mixed with thorough agitation at a temperature below the boiling point of the diluent and above the coagulation point. The catalyst may be prepared either in the presence or absence of the monomers. It is one of the advantageous features of the invention that the catalyst can be prepared at or above room temperature.

The amount of the component (A) to be used in the catalyst preparation varies with the molecular weight of the polymer to be produced and the velocity of the copolymerization reaction, but it ranges from 0.1 millimole to 1 mole, usually from 2 millimoles to 200 millimoles, per liter of the reaction mixture.

Among the conjugated dienes which may be employed in the practice of this invention are butadiene, isoprene, 1,3-pentadiene, 2,3-dimethyl butadiene, and 5-methyl-1,3,5-heptatriene. Examples of the $\alpha$-olefins are propylene, butene-1, hexene-1 and heptene-1. The amount of the monomeric mixture is adequate if it is in the range of 0.1 to 100 mols per liter of reaction mixture. As an alternative, the reaction may be effected by blowing the monomers in gaseous form into the catalyst system. There are no special limitations as to the amounts of the monomers, because they may be suitably chosen in view of the molecular weight or composition of the copolymer to be produced. The proportions of the conjugated diene and olefin, or of the conjugated diene, ethylene and $\alpha$-olefin, are dictated by the physical properties of the copolymer to be produced, and therefore the mixing ratio is not subject to special limitations.

The present invention is generally carried out in the presence of a diluent, although it may be effected with the monomers alone in the absence of any diluent. The diluent is required only to be inert with respect to the catalyst components. Typical diluents are aromatic hydrocarbons, such as benzene, toluene, and xylene, aliphatic hydrocarbons, such as propane, butane, pentane, hexane, heptane, and octane, and alicyclic hydrocarbons such as cyclohexane, tetraline, and decaline.

Although the reaction of the invention takes place in an atmosphere of an inert gas and at such temperature and pressure which maintain the reaction system in liquid state, there is no limitation to the pressure. The polymerization reaction is suitably effected at a temperature not lower than $-78°$ C. but not higher than $150°$ C., preferably between $-30°$ and $100°$ C.

The conjugated diene-olefin copolymers and ethylene-propylene-conjugated diene terpolymers which are obtained in accordance with this invention are of random type, unlike the copolymers obtained by conventional processes, and have lower melting points than the ordinary block-type copolymers. They are expected to find applications as useful industrial materials in the form of rubber, intermediate products of rubber and plastics, and plastics.

The present invention will be illustrated by the following examples, although it should be understood that the invention is not limited thereto but numerous other modifications are possible without departing from the spirit and scope of the invention.

EXAMPLES 1 TO 8

Thirty milliliters of toluene, 3.0 millimoles of trichloroacetic acid, 1.0 millimole of vanadyl oxytrichloride, and 3.0 millimoles of triethyl aluminum were charged, in the order mentioned, into a 100 ml.-sealed tube of glass, and were allowed to react with stirring in a nitrogen atmosphere and at a predetermined temperature for 30 minutes. Next, 4.1 grams of butadiene and 3.2 grams of propylene were added, and the tube was sealed again. With stirring, the mixture was reacted for polymerization at $40°$ C. for 20 hours.

After the polymerization, the glass tube was opened and immediately a small amount of phenyl-$\beta$-naphthylamine was added. Following thorough mixing, the reaction mixture was poured into a hydrochloric acid-methanol solution which contained age resistor, so that the catalyst was decomposed and simultaneously the polymer produced was precipitated. The polymer so precipitated was washed several times with methanol, and dried in vacuum overnight at $40°$ C. The results of experiments conducted in the manner described but at different temperatures are given in Table 1.

TABLE 1[a]

| Example | Catalyst preparg. temp. (° C.) | Polymer yield (grams) | $\eta$sp./C.[b] | IR $1,380_{cm}^{-1}$ $970_{cm}^{-1}$ |
|---|---|---|---|---|
| 1 | −78 | 5.38 | 0.16 | 0.379 |
| 2 | −40 | 6.09 | 0.14 | 0.494 |
| 3 | −20 | 5.49 | 0.13 | 0.516 |
| 4 | −10 | 5.85 | 0.13 | 0.610 |
| 5 | 0 | 4.72 | 0.12 | 0.750 |
| 6 | 10 | 4.74 | 0.13 | 0.619 |
| 7 | 20 | 5.07 | 0.16 | 0.614 |
| 8 | 40 | 2.65 | 0.20 | 0.487 |

[a] Each component of the catalyst was diluted with toluene to a concentration of 1 mole/liter.
[b] Measured with toluene solvent at 30° C.

The copolymers of Examples 1 to 8 were all rubbery materials and were confirmed to contain butadiene and propylene by infrared absorption spectra and NMR spectra. The butadiene units of the copolymers were mostly of trans-1,4 form (over 98%). There was no butadiene unit in the cis-1,4-configuration, but some vinyl type units appeared to be present.

Referential examples are given in Table 2, which demonstrate that rubber-like copolymers are obtained by the presence of three components, i.e., trichloroacetic acid, vanadium trichloride, and triethyl aluminum, as in the present invention.

TABLE 2[a]

| Reference Example | Trichloroacetic acid (mM.) | Vanadyl-trichloride (mM.) | Triethyl aluminum (mM.) | Yield (grams) | Remarks |
|---|---|---|---|---|---|
| 1 | 1 | 0.5 | | | No polymer. |
| 2 | | 1 | 2 | do | |
| 3 | | | 0.5 | 2 | 2.1 | 34% gel.[b] |

[a] Total volume 50 ml., solvent toluene, butadiene 75 millimoles and propylene 75 millimoles, polymerization temperature 40° C., and polymerization time 20 hrs. Temperature at which the catalyst was prepared: −78° C., 30 min.
[b] Balance (66%) liquid.

Also, it will be clear from the referential examples given in Table 3 that this invention is directed to the manufacture of high-molecular rubber-like copolymers, and has nothing to do with the synthesis of halogenated aluminum compounds with AlR$_3$-TCA reaction.

TABLE 3 a

| Reference Example | VOCl$_3$ (mM.) | AlEt$_2$Cl (mM.) | AlEt$_{1.5}$Cl$_{1.5}$ (mM.) | Yield (grams) | Form of copolymer |
|---|---|---|---|---|---|
| 4 | 0.5 | 2 | | 8.77 | Gel (resinous). Sticky low-molecular. |
| 5 | 0.5 | | 2 | 1.07 | Polymer (80% trans-1,4 and 20% vinyl). | a Total volume 50 ml. solvent toluene, butadiene 75 millimoles and propylene 75 millimoles, polymerization temperature 40° C., and polymerization time 18 hours. Temperature at which the catalyst was prepared: −78° C., 30 min.

EXAMPLES 9 AND 10

Examples 9 and 10 are intended to demonstrate that conjugated diene-olefin copolymers are obtained by replacing one of the catalyst components, triethyl aluminum, with other trialkyl aluminums. The procedure was otherwise the same as described in Example 1.

The results were as shown in Table 4.

TABLE 4 a

| Example | Trialkyl aluminum | Yield (grams) | η sp./C.b | Form of copolymer |
|---|---|---|---|---|
| 9 | Triisobutyl aluminum | 6.06 | 0.13 | Rubber-like. |
| 10 | Trihexyl aluminum | 4.62 | 0.15 | Do. | a Total volume 50 ml., solvent toluene, butadiene 75 millimoles, propylene 75 millimoles, trichloroacetic acid 1 millimole, vanadyl trichloride 0.5 millimole and trialkyl aluminum 0.5 millimole. Catalyst preparation at −78° C for 30 min. Polymerization at 40° C. for 20 hours.
b Measured in toluene solution at 30° C.

EXAMPLES 11 TO 14

Examples 11 to 14 testify to the fact that conjugated diene-olefin copolymers are obtained despite replacement of one of the catalyst components, trichloroacetic acid, with other halogenated organic acids. The procedure was otherwise the same as in Example 1. The results were as shown in Table 5.

TABLE 5 a

| Example | Halogenated organic acid | Yield (grams) | ηsp./C.b | Form of copolymer |
|---|---|---|---|---|
| 11 | Cl$_2$CHCOOH | 3.20 | | Sticky rubber. |
| 12 | ClCH$_2$COOH | 5.11 | | Do. |
| 13 | F$_3$COOH | 6.72 | 0.16 | Rubber-like. |
| 14 | Br$_3$COOH | 2.03 | | Sticky rubber. | a Total volume 50 ml., solvent toluene, butadiene 75 millimoles, propylene 75 millimoles, halogenated organic acid 1 millimole, vanadyl trichloride 0.5 millimole, and triethyl aluminum 2 millimoles. Catalyst preparation at −78° C. for 30 min. Polymerization at 40° C. for 20 hours.
b Measured in a toluene solution at 30° C.

EXAMPLES 15 AND 16

Examples 15 and 16 demonstrate that conjugated diene-olefin copolymers are obtained even if one of the catalyst components, vanadyl trichloride, is replaced by other vanadium compounds. The procedure was generally the same as that in Example 1. The results are given in Table 6.

EXAMPLES 17 TO 22

Examples 17 to 22 show that rubber-like copolymers are obtained despite changes in the mixing ratio of butadiene and propylene. The results are given in Table 7.

TABLE 6 a

| Example | Vanadium compound | Conversion (percent) | Form of copolymer |
|---|---|---|---|
| 15 | VO(acac)$_2$ b, 50 mg. | 1.35 | Rubber-like. |
| 16 | VCl$_4$, 0.5 mM. | 18.7 | Do. | a Total volume 50 ml., solvent toluene, butadiene 75 millimoles, propylene 75 millimoles, trichloroacetic acid 1 millimole, and triethyl aluminum 2 millimoles.
Catalyst preparation at −78° C. for 30 min. Polymerization at 40° C. for 18 hours.
b "acac" stands for acetylacetone.

TABLE 7 a

| Ex. | Propylene-butadiene ratio (molecular) | Yield (percent) | ηsp./C.b | Form of copolymer | Butadiene content of copolymer |
|---|---|---|---|---|---|
| 17 | 30/70 | 90 | 0.30 | Rubber-resin. | |
| 18 | 40/60 | 77 | 0.26 | Rubber | 57 |
| 19 | 50/50 | 70 | 0.20 | do | |
| 20 | 60/40 | 61 | 0.19 | do | 50 |
| 21 | 70/30 | 54 | 0.24 | do | |
| 22 | 80/20 | 45 | 0.24 | do | 19 | a Total volume 50 ml., solvent toluene, trichloroacetic acid 2 millimoles, vanadyl trichloride 1 millimole, triethyl aluminum 3 millimoles, and propylene plus butadiene 150 millimoles. Catalyst preparation at 0° C. for 1 hour. Polymerization at 40° C. for 20 hours.
b Measured by NMR absorption spectra.

EXAMPLES 23 TO 32

Examples 23 to 32 indicate that, in the copolymerization of butadiene and propylene, high polymerization temperatures are preferred to low temperatures. The results are given in Table 8.

TABLE 8 a

| | Polymerization of— | | | |
|---|---|---|---|---|
| Example | Temp. (° C.) | Time (hours) | Yield (grams) | Form of copolymer |
| 23 | −78 | 7 | Trace | |
| 24 | −78 | 25 | Trace | |
| 25 | 0 | 7 | 44 | Rubber. |
| 26 | 0 | 25 | 72 | Do. |
| 27 | 20 | 7 | 74 | Do. |
| 28 | 20 | 25 | 98 | Do. |
| 29 | 40 | 7 | 77 | Do. |
| 30 | 40 | 25 | 98 | Do. |
| 31 | 70 | 7 | 84 | Do. |
| 32 | 70 | 25 | 85 | Do. | a Total volume 50 ml, solvent toluene, trichloroacetic acid 1 millimole, vanadyl trichloride 0.5 millimole, triethyl aluminum 2 millimoles, butadiene 75 millimoles and propylene 75 millimoles. Catalyst preparation at −78) C. for 1 hour.

EXAMPLES 33 AND 34

Examples 33 and 34 demonstrate that combinations of propylene and conjugated dienes other than butadiene give copolymers as well. The results are shown in Table 9.

TABLE 9 a

| Example | Conjugated diene | Propylene (mM.) | Toluene (ml.) | Polymerization time (hours) | Yield (grams) | Form of copolymer |
|---|---|---|---|---|---|---|
| 33 | Isoprene | 72.7 | 34 | 16 | 6.96 | Rubber. |
| 34 | 1,3-pentadiene | 20.0 | 41 | 18 | 1.48 | Do. | a Conjugated diene/propylene=1/1 (molar ratio). Trichloroacetic acid/oxyvanadium trichloride/triethyl aluminum=1/0.5/2 (molar ratio), triethyl aluminum 2 millimoles. Catalyst preparation at −78° C for 30 min. Polymerization temperature 40° C.

EXAMPLE 35

Example 35 is illustration of the manufacture of butadiene - ethylene copolymer. A 200-ml. separable flask equipped with an agitator, a gas inlet, a solvent and catalyst solution inlet, and a nitrogen gas inlet, was dried out and the atmosphere inside was replaced by nitrogen. In the nitrogen atmosphere and at 0° C., 100 ml. of solvent heptane, 2 ml. of a solution of one mole trichloroacetic acid in a liter of heptane, 1 ml. of a solution of one mole of vanadyl trichloride in a liter of heptane, and 3 ml. of a solution of one mole of triethyl aluminum in a liter of heptane were placed in the flask, in the order mentioned. After the preparation of the catalyst with stirring at 0° C. for 30 minutes, the temperature of the reaction system was maintained at 20° C. and butadiene and ethylene at a flow velocity ratio of 1:4 were simultaneously blown into the flask for polymerization. The flow velocity of butadiene was 0.066 cubic centimeter per minute. The polymerization was terminated 15 minutes later by the addition of a solution of phenyl-$\beta$-naphthylamine in toluene. The polymer solution was poured into a hydrochloric acid-methanol solution which contained age resistor. The polymer thus precipitated was washed several times with methanol and vacuum dried overnight at 40° C., when 1.92 grams of white powder was obtained. The polymer formed a uniform film, and its infrared absorption spectrum indicated the absorptions characteristic of butadiene and ethylene.

EXAMPLE 36

Using the same apparatus as in Example 35 but with the addition of dripping means, isoprene and ethylene were copolymerized. The kind of solvent, amount of catalyst, and conditions for preparation of the catalyst were the same as in Example 35. The polymerization was carried out at 5° C. for 30 minutes. Ethylene was blown into the vessel at a flow velocity of 0.264 cc./min., and isoprene was added at a rate of 10 drops per minute. The resulting polymer was white powder, amounting to 1.80 grams. It formed a uniform film, and its infrared absorption spectrum indicated the presence of isoprene and ethylene.

EXAMPLES 37 TO 40

Examples 37 to 40 show what happen if the copolymerization is carried out using solvents other than toluene. The results are given in Table 10.

TABLE 10 [a]

| Example | Solvent | Polymerization of— | | Yield (percent) | $\eta sp./ C.$[b] | Form of copolymer |
|---|---|---|---|---|---|---|
| | | Temp. (° C.) | Time (hour) | | | |
| 37 | Heptane | 40 | 20 | 5.18 | 0.12 | Rubber. |
| 38 | do.[c] | 40 | 20 | 3.93 | 0.15 | Do. |
| 39 | Methylene chloride | 20 | 20 | 3.36 | Gel | Powder. |
| 40 | Chlorobenzene | 40 | 20 | 3.68 | Gel | Do. |

[a] Total volume 50 ml. Trichloroacetic acid 1 millimole, vanadyl trichloride 0.5 millimole, triethyl aluminum 2 millimoles, propylene 75 millimoles, and butadiene 91 millimoles. Catalyst preparation at 78° C. for 30 min.
[b] Measured in a toluene solution at 30° C.
[c] Triethyl aluminum was replaced by triisobutyl aluminum.

EXAMPLE 41

A one-liter stainless steel reactor equipped with an agitator and pressure gage and formed with inlets for gas, catalyst and solvent, and nitrogen gas, was thoroughly dried and the atmosphere inside was replaced by nitrogen. Following the addition of 800 ml. of toluene, the reactor was cooled to −78° C. while stirring the solvent. Next, 20 ml. of propylene and 7, 7 and 21 ml., respectively, of solutions prepared by dissolving one mole each of trichloroacetic acid, oxyvanadium dichloromonoethoxide, and triethyl aluminum in one-liter portions of toluene were charged into the vessel, in the order mentioned. The resulting catalyst was matured at −78° C. for 30 minutes. Then, with the addition of 200 ml. of propylene, the system was maintained at a temperature of 40° C., butadiene was forced by the gas pressure of nitrogen into the system at a rate of 7.5 moles per hour, and the reaction was carried out for 8 hours.

On conclusion of the reaction, the pressure of the system was released, a little amount of an age resistor (2,6-di-t-butyl-p-cresol) was added, and methanol and hydrochloric acid were added to cause coagulation of the reaction product on a mixer. The deposit, upon drying overnight under reduced pressure and at 60° C., gave 19.3 grams of polymer. Its infrared absorption spectrum showed that all of its butadiene units were of transform and that there was no trace of 1,2- and cis-forms. The product was found from an NMR absorption spectrum to contain 7.0 mo. percent of butadiene and 93.0 mol. percent of propylene. The $$\eta sp./c._{TL}^{30°}$$

of the product was 1.74.

EXAMPLE 42

The procedure of Example 41 was repeated except that toluene was replaced by the same amount of cyclohexane, the catalyst preparation temperature was changed to 10° C., the polymerization temperature to 20° C., the butadiene charging rate to 48 ml./hr., and the reaction time to 2.0 hrs. A rubber-like polymer was obtained in a yield of 13.7 grams. An infrared absorption spectrum indicated that all of the butadiene units were of trans and an NMR absorption spectrum showed that the butadiene content of the polymer was 18 mol. percent. The $$\eta sp./c._{TL}^{30°}$$

of the polymer was 1.77.

EXAMPLE 43

An apparatus similar in construction to the one used in Example 41 except that the vessel had no gas inlet but was associated with a pressure vessel containing a mixture of 100 ml. each of butadiene and propylene was employed.

In the dry, one-liter reactor of stainless steel was placed 800 ml. of cyclohexane and, while the reaction system was kept at 20° C., 10 ml. of propylene was added. Then, 7, 7 and 21 ml., respectively, of solutions of one mole each of trichloroacetic acid, oxyvanadium dichloromonoethoxide, and triethyl aluminum in one liter each of cyclohexane, were added in the order mentioned. Without maturing but agitating the resulting catalyst, 100 ml. of propylene was added. By introducing a premixed solution of butadiene and propylene into this system at a rate of 40 ml. per hour, the mixture was reacted for 5 hours. Subsequently the same steps as used in Example 1 were resorted to, when 12.1 grams of a rubber-like polymer resulted.

It was found from an infrared absorption spectrum that the butadiene units of the product were all of trans-form, and from an NMR absorption spectrum that the product has a butadiene content of 22 mol. percent. Its $$\eta sp./c.^{30° C.}$$

was 1.28.

EXAMPLE 44

A 500-ml. separable flask equipped with an agitator and formed with inlets for material gas, catalyst, solvent and nitrogen gas was thoroughly dried, and the atmosphere inside was replaced by nitrogen. In the nitrogen atmosphere and at 0° C., 300 ml. of solvent heptane, 4 ml. of a one-mole trichloracetic acid/liter toluene solution, 2 ml. of a one-mole vanadyl trichloride/liter toluene solution, and 6 ml. of a one-mole triethyl aluminum/liter heptane solution were charged into the flask, in the order mentioned. The mixture upon agitation for 60 minutes gave a catalyst (in the form of a brownish solution). While the temperature of the reaction system was maintained at 0° C., polymerization was effected by simultaneously blowing butadiene, propylene, and ethylene, respectively, at the rates of 0.11, 1.5 and 0.66 cc. per minute, into the flask. Several ten minutes later, the reaction system gained viscosity. Eighty minutes later, the polymerization reaction was brought to a stop by the addition of a solution of phenyl-$\beta$-naphthylamine in toluene. The polymer solution was poured into a hydrochloric acid-methanol solution which contained age resistor to cause precipitation of the polymer. The polymer was washed several times with methanol and vacuum dried overnight 40° C. In this manner 2.33 grams of a rubber-like polymer was formed.

An infrared absorption spectrum of the polymer indicated absorptions characteristic of butadiene, propylene and ethylene. Butadiene occurred mostly in the trans-1,4 form. The copolymer composition calculated from an NMR absorption spectrum was, at a molar ratio, ethylene:propylene:butadiene—48:48:4. This terpolymer was soluble in cold toluene and its $\eta$ sp./C. at 30° C. was 2.09.

EXAMPLE 45

Using the same apparatus as in Example 41, 300 ml. of toluene, 4 ml. of a one-mole trichloroacetic acid/liter toluene solution, 2 ml. of a one-mole vanadyl trichloride/liter toluene solution, and 6 ml. of a one-mole triethyl aluminum/liter toluene solution were placed, in the order mentioned, into the flask in a nitrogen atmosphere at 0° C. After agitation for 60 minutes, a catalyst was prepared (as a brownish solution), the temperature of the reaction system was kept at —20° C., and butadiene, propylene, and ethylene were simultaneously blown in at the same rates as in Example 41 to effect polymerization. After a polymerization period of one hour, 1.20 grams of a rubber-like polymer resulted. This polymer separated itself into portions which are soluble or insoluble in cold toluene. The portion insoluble in cold toluene was soluble in hot toluene. Infrared absorption spectra of the cold-toluene insoluble portion and hot-toluene-soluble portion both showed absorptions characteristic of butadiene, propylene, and ethylene, and no difference was observed between the two.

EXAMPLE 46

With the same apparatus as employed in Example 41, 200 ml. of heptane, 4 ml. of a one-mole trichloroacetic acid/liter heptane solution, 2 ml. of a one-mole vanadyl trichloride/liter heptane solution, and 6 ml. of a one-mole triethyl aluminum/liter heptane solution was introduced, in the order mentioned, into the flask in a nitrogen atmosphere at 0° C. After the preparation of catalyst (as a brownish solution) with stirring for 60 minutes, the reaction system was kept at a temperature of 0° C., and butadiene, propylene, and ethylene were blown altogether into the vessel. The blowing rates of the respective monomers were the same as in Example 41. The polymerization over a period of one hour yielded 2.93 grams of a rubber-like copolymer, $\eta$ sp./C.=1.93°. With an infrared absorption spectrum this rubber-like product was identified to be a terpolymer. An NMR absorption spectrum showed that it consisted of ethylene, propylene, and butadiene at a molar ratio of 53:40:7.

EXAMPLE 47

Using the apparatus of Example 41, a catalyst (brownish solution) was prepared from 6 millimoles of trichloroacetic acid, 3 millimoles of vanadyl trichloride, and 9 millimoles of triethyl aluminum in toluene with agitation at 0° C. for 60 minutes. While the system was being kept at 50° C., butadiene, propylene, and ethylene were simultaneously blown in at a velocity ratio of 1:1:2 for ternary copolymerization. In 6 hours 8.90 grams of a rubber-like copolymer resulted.

EXAMPLE 48

Under the same conditions as in Example 42 excepting that the butadiene was replaced by isoprene, ternary copolymerization was carried out and 1.12 grams of a rubber-like copolymer was obtained.

EXAMPLE 49

In the same apparatus as used in Examuple 41, a catalyst (brownish solution) was prepared from 2 millimoles of trichloroacetic acid, 1 millimole of vanadyl trichloride, 3 millimoles of triethyl aluminum, and 100 ml. of heptane, at 5° C. for 60 minutes. The temperature of the system was maintained at 5° C., and butadiene, butene-1, and ethylene were simultaneously blown into the flask at a flow velocity ratio of 1:20:3 for ternary copolymerization. The flow velocity of butadiene was 0.11 cc./min. In 18 minutes, 200 grams of a rubber-like copolymer was obtained. An infrared absorption spectrum indicated that this rubbery substance was a terpolymer, $\eta$ sp./c.=1.00.

EXAMPLE 50

With the same apparatus and under the same conditions as in Example 46, butadiene, propylene, and ethylene were copolymerized. In 35 minutes, 1.98 grams of a rubber-like copolymer was afforded. Its $\eta$ sp./c. was 1.25.

EXAMPLE 51

The polymerization procedure of Example 47 was repeated except that the triethyl aluminum was replaced by trihexyl aluminum. Forthy minutes of the reaction gave 1.68 grams of a rubber-like copolymer.

EXAMPLE 52

Using the same apparatus as in Example 41, a catalyst (brownish solution) was prepared by agitating 4 millimoles of trichloroacetic acid, 2 millimoles of vanadyl trichloride, and 8 millimoles of triethyl aluminum in 200 ml. of n-heptane at 5° C. for 40 minutes. The temperature of the system was maintained, and butadiene, propylene, and ethylene were blown in at flow rates, respectively, of 0.25, 0.80 and 0.23 ml. per minute. The ternary copolymerization over a period of 80 minutes afforded 4.16 grams of a rubber-like copolymer. The viscosity of the copolymer in toluene at 30° C. was $\eta$ sp./c.=1.06. From an NMR absorption spectrum, the composition was identified to be ethylene:propylene:butadiene=44:46:10.

EXAMPLE 53

In the same apparatus as used in Example 41, a catalyst (brownish solution) was prepared by adding 2 millimoles of trichloroacetic acid, 1 millimole of vanadyl trichloride, and 3 millimoles of trinormal-hexyl aluminum to 100 ml. of n-heptane and agitating the mixture at 5° C. for 60 minutes. While maintaining the system at 5° C., ternary copolymerization was carried out by blowing butadiene, propylene, and ethylene thereinto at flow rates, respectively, of 0.17, 0.80, and 0.25 ml. per minute. Thirty minutes later, 1.60 grams of a rubber-like copolymer was obtained. The viscosity of the copolymer in toluene at 30° C. was $\eta$ sp./c.=1.01. The composition was identified from an NMR absorption spectrum to be ethylene:propylene:butadiene=53:40:7.

EXAMPLE 54

In the same apparatus as in Example 41, 2 millimoles of trifluoroacetic acid, 1 millimole of vanadyl trichloride, and 3 millimoles of triisobutyl aluminum were added to 100 ml. of n-heptane, and the mixture was agitated at 5° C. for 30 minutes to prepare a catalyst (bownish solution). Then, the system was maintained at 10° C., and butadiene, propylene, and ethylene were blown in at rates, respectively, of 0.15, 0.73, and 0.31 ml. per minute, for ternary copolymerization. In 26 minutes, 3.36 grams of a rubber-like copolymer resulted.

EXAMPLE 55

Using the same apparatus as in Example 41, a catalyst (brownish solution) was prepared by adding 2 millimoles of trichloroacetic acid, 244 milligrams of vanadyl acetyl acetonate, and 4 millimoles of triisobutyl aluminum to 100 ml. of n-heptane and agitating the mixture at 5° C. for 30 minutes. Then, the system was maintained at 10° C., and butadiene, propylene, and ethylene were blown in at the rates, respectively, of 0.15, 0.77, and 0.32 ml. per minute. After 60 minutes of the ternary copolymerization, 0.90 gram of a rubber-like copolymer was obtained.

EXAMPLE 56

With the same apparatus as in Example 41, a catalyst (brownish solution) was prepared from 2 millimoles of trichloroacetic acid, 1 millimole of vanadyl trichloride, and 3 millimoles of triisobutyl aluminum in 100 ml. of cyclohexane, by agitation at 10° C. for 30 minutes. The system was kept at 15° C., and butadiene, propylene, and ethylene were blown in simultaneously at the flow rates, respectively, of 0.17, 0.80, and 0.35 ml. per minute for ternary copolymerization. Ten minutes afterwards, 2.01 grams of a rubber-like copolymer was obtained.

EXAMPLE 57

Using the same apparatus as in Example 41, a catalyst was prepared in the form of a brownish solution by adding 0.02 mole of propylene to 100 ml. of n-heptane, and further adding 2 millimoles of trichloroacetic acid, 1 millimole of vanadyl trichloride, and 3 millimoles of triisobutyl aluminum, and then agitating the mixture at −78° C. for 30 minutes. The catalyst system was kept at 20° C., and butadiene, propylene, and ethylene were blown in at the flow rates of 0.17, 0.7, and 0.30 ml. per minute. The ternary copolymerization over a period of 22 minutes gave 2.16 grams of a rubber-like copolymer.

In order to prove that the advantageous effects of the present invention are achieved only by the use of a catalyst system consisting of a trialkyl aluminum, vanadium compound, and halogenated organic acid, and also to clarify that the catalyst system of the invention is substantially distinct from the conventional alkylaluminum halide-vanadium compound catalyst system, some referential examples will be presented as below.

REFERENTIAL EXAMPLE 6

Using the same apparatus as used in Example 41, a catalyst (brownish solution) was prepared by adding 1 millimole of vanadyl trichloride and 5 millimoles of aluminum sesquichloride to 100 ml. of toluene and agitating the mixture at 5° C. for 5 minutes. The system was maintained at 10° C., and butadiene, propylene, and ethylene were blown in at the flow rates, respectively, of 0.16, 0.87, and 0.32 ml. per minute. This ternary copolymerization yielded no rubber-like copolymer but 4.30 grams of a powdery polymer.

REFERENTIAL EXAMPLE 7

In the same apparatus as in Example 41, a catalyst (brownish solution) was prepared by adding 1 millimole of vanadyl trichloride and 5 millimoles of aluminum sesquichloride to 100 mls. of n-heptane and agitating the mixture at 5° C. for 10 minutes. The system was kept at 10° C., and butadiene, propylene, and ethylene were blown in at the flow rates, respectively, of 0.17, 0.78, and 0.34 ml. per minute for ternary copolymerization. Instead of a rubber-like copolymer, 1.28 grams of a powdery polymer was obtained.

REFERENTIAL EXAMPLE 8

Using the same apparatus as in Example 41, butadiene, propylene, and ethylene monomers were blown into 100 ml. of n-heptane at the same flow rates as in Example 53. To this system were added 5 millimoles of aluminium sesquichloride and 1 millimole of vanadyl trichloride, in the order mentioned, and the mixture was allowed to react at 10° C. for 50 minutes. The solution became purplish and clear. As a result, 1.53 grams of a sticky, rubbery copolymer and 0.98 gram of a powdery polymer were formed.

In the synthesis of EPM and EPDM, it is customary procedure to charge the catalyst components into the reaction vessel in the presence of the monomers. Then, the solution becomes purplish in color, and a rubber-like, amorphous copolymer is obtained. In Referential Example 8 wherein BD was used, a sticky polymer of a low molecular weight and a non-rubbery, powdery polymer were obtained. In Referential Example 6 wherein the catalyst was prepared in the presence of the monomers, merely a powdery polymer was obtained. From these examples it is obviously wrong to consider that the $AlR_3$-TCA reaction gives $Et_2AlCl$ and $Et_3Al_2Cl_3$, adapted for the EP polymerization, which in turn react with $VOCl_3$ to form a catalyst.

The catalyst according to this invention is rather preferably prepared in the absence of the monomers, and the resulting polymer is not powdery but rubber-like. In the presence of the monomers, a rubber-like polymer is obtained as well.

What is claimed is:

1. A process for preparing conjugated diene-propylene copolymers which comprises bringing a conjugated diene and propylene into contact with a catalyst which is made of (A) at least one trialkyl aluminum selected from the group consisting of trimethyl aluminum, triethyl aluminum, triisobutyl aluminum, and trihexyl aluminum, (B) at least one vanadium compound selected from the group consisting of vanadium tetrachloride, vanadium trichloride, vanadyl trichloride, vanadium trisacetyl acetonate, vanadyl acetyl acetonate, vanadyl naphthenate, vanadyl triethoxide, vanadyl tributoxide, vanadyl dichloromonoethoxide, vanadyl chlorodiethoxide, and vanadyl dichloromonobutoxide, and (C) at least one halogenated acetic acid selected from the group consisting of trichloroacetic acid, tribromoacetic acid, trifluoroacetic acid, dichloroacetic acid, and monochloroacetic acid, the molar ratio of (A) to (B) ranging from 1:0.01 to 1:10 and the molar ratio of (A) to (C) from 1:0.1 to 1:10, in the presence of a hydrocarbon solvent at a temperature between −78° C. and 150° C.

2. A process according to claim 1 wherein the conjugated diene is butadiene.

References Cited
UNITED STATES PATENTS

| | | | |
|---|---|---|---|
| 3,280,082 | 10/1966 | Natta et al. | 260—80.7 |
| 3,301,834 | 1/1967 | Christman | 260—80.5 |
| 3,337,514 | 8/1967 | Knabeschuh et al. | 260—80.7 |
| 3,627,740 | 12/1971 | Schafer et al. | 260—80.78 |

JOSEPH L. SCHOFER, Primary Examiner

S. M. LEVIN, Assistant Examiner

U.S. Cl. X.R.

260—80.7